United States Patent

[11] 3,613,538

[72] Inventor Charles Horberg, Jr.
Chicago, Ill.
[21] Appl. No. 780,544
[22] Filed Dec. 2, 1968
[45] Patented Oct. 19, 1971
[73] Assignee Norman Industries, Inc.
Chicago, Ill.

[54] CAMERA PATH GENERATOR
9 Claims, 8 Drawing Figs.

[52] U.S. Cl. .......... 95/15, 95/86, 352/243
[51] Int. Cl. .......... G03b 37/00
[50] Field of Search .......... 95/15, 86; 352/139, 140, 69, 243

[56] References Cited

UNITED STATES PATENTS

| | | | |
|---|---|---|---|
| 3,181,174 | 4/1965 | Griffioen | 352/188 X |
| 3,285,151 | 11/1966 | Black | 352/69 X |
| 3,437,753 | 4/1969 | Stith | 95/15 X |
| 1,136,761 | 4/1915 | Becker | 95/15 |
| 1,463,446 | 7/1923 | Snowden | 352/243 UX |
| 1,730,346 | 10/1929 | Beeson | 95/86 |
| 2,456,317 | 12/1948 | Radinow | 352/140 X |
| 2,673,502 | 3/1954 | Skodock | 95/86 |
| 3,164,838 | 1/1965 | Heinrich | 352/243 X |

*Primary Examiner*—Samuel S. Matthews
*Assistant Examiner*—Monroe H. Hayes
*Attorney*—Alter and Weiss

ABSTRACT: A path generator for scanning devices, such as surveillance cameras. When the scanning devices are inclined and sweep through an arc the projection of the line of sight of the camera on a vertical plane parallel to a line tangential to the arc at its midpoint is a vertical arc with the apex at the center. The path generator varies this normal projection path to form a substantially straight projection path, for example.

PATENTED OCT 19 1971

3,613,538

INVENTOR
CHARLES HORBERG, JR.

BY Alter and Weiss
ATTORNEYS

INVENTOR
CHARLES HORBERG, JR.

BY Alter and Weiss
ATTORNEY

CAMERA PATH GENERATOR

This invention relates to scanning devices, and more particularly to path generators for surveillance camera devices which reciprocatingly scan and expose film. This invention is related to the copending application filed May 13, 1968, bearing Ser. No. 728,405, now Pat. No. 3,568,583, entitled: "Surveillance Camera Device and Controls Therefor."

Surveillance cameras are used in increasing numbers as antitheft devices at locations including banks and self service stores, such as supermarkets or discount trade centers. Some of the original antitheft surveillance cameras were fixedly mounted to point at certain displays and therefore, provided security only with regard to those displays. Subsequently, the cameras were provided with controls for causing them to reciprocatingly scan over a fixed arc. This, of course, vastly increased the range of surveillance.

In order to locate the cameras at a position wherein they are not accessible to tampering by the general public in the store, it is necessary to mount these cameras higher than the general reach of the public. Therefore, the cameras must be inclined downwardly in order to enable a view of any potential thieves in action, that is at approximately shoulder level. Because of the angle of inclination, the line of sight or focal points of the cameras generate vertical arcs when they are reciprocatingly actuated to scan in substantially horizontal arcs. Part of the arcs, accordingly, serves no useful funtion in surveillance scanning because the cameras are focused at a point below the knees of the public using the stores facilities. The way commonly used at present to avoid such wasteful scanning is to limit the arcs through which the cameras scan. Therefore, more cameras are required to provide adequate coverage of a given area under surveillance.

An object of the invention is to provide a path generator means for surveillance cameras to enable complete coverage of an area by surveillance cameras using fewer such cameras.

A related object of the present invention is to provide path generator means for surveillance cameras, whereby the path generated by a projection of the line of sight of the camera approaches a straight line function.

Yet another object of the invention is to provide path generator means for reciprocating devices, which enables the projection path of the reciprocating devices to be readily changed.

A preferred embodiment of this invention comprises a surveillance camera equipped with a reciprocating mechanism having a large arc of scan. Means are provided for automatically varying the angle of inclination throughout the scanning arc.

The above mentioned and other features and objects of this invention and the manner of obtaining them will become more apparent, and the invention itself will be best understood by reference to the following description of an embodiment of the invention taken in conjunction with the accompanying drawings, wherein.

Figures 1, 2:
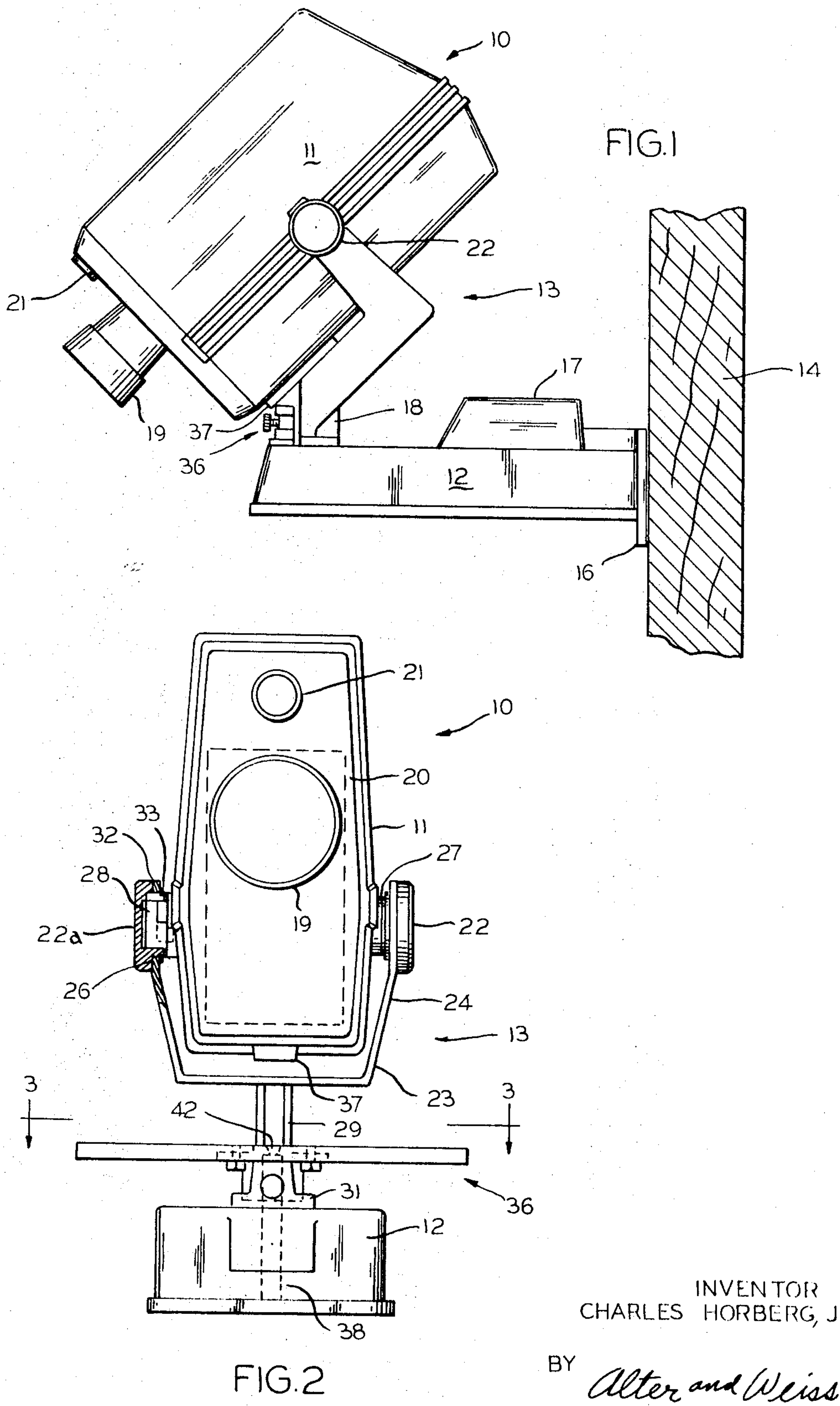
FIG. 1 shows a side view of a surveillance camera mounted to a wall and inclined at an angle to the horizontal.
FIG. 2 is a front view of the reciprocating scanning camera device.

Referring now to the drawings wherein like reference numbers are used in the different drawings to explain the inventive unit, the surveillance cameras assembly is generally designated as unit 10. A camera case 11 is shown mounted to a shroud base 12 by means of for yoke assembly 13. The shroud base 12 is affixed in any well-known manner to a support means such as wall or post 14 using bracket 16. The shroud 12 is equipped with a drive device such as motor 17 and controls not shown. The motor 17 causes the reciprocating rotation of axis 18 which in turn causes the camera to reciprocatingly scan over a fixed arc. The camera case 11 is equipped with a lens hood 19. As best seen in FIG. 2 the case 11 is equipped with a camera 20. A pilot light 21 may be provided FOR indicating that the camera is in operation.

Means are provided for attaching the camera case 11 to the yoke assembly 13 to enable the angle of inclination of the camera to be easily varied. More particularly, knob means 22, 22*a* hold the camera case 11 affixed to the yoke 13. For example, FIG. 1 shows the angle inclined at an inclination of approximately 38°. The knobs 22, 22*a* are journaled in an opening in the yoke and provide bearing surfaces to assure free vertical movement of the camera case 11 within the yoke so that the angle of inclination can be readily adjusted.

As best seen in FIG. 2, yoke 13 comprises a substantially U-shaped portion 23 having upwardly disposed legs 24 and 26 for receiving knobs 22 and 22*a*, respectively. The knobs fit over outwardly disposed axle portions 27, 28, respectively, extending from the sides of the camera case. Thus, the camera 11 pivots about the axis extending through axle portions 27, 28 which fit through holes in the U-shaped portion 23 of yoke 13. A standard portion 29 of the U-shaped yoke supports the yoke at the center of the U-shaped portion 23. The knobs 22 can be attached to the protruding portions 27, 28 in any well known manner to assure the firm hold by knobs 22 and 22*a* to protruding portions 27 and 28. Vertically disposed standard portion 29 ends in a base portion 31 which is attached to the reciprocatingly rotating shaft 18, in any well-known manner.

One means of attaching the knobs is shown in FIG. 2. Therein, a section is shown through knob 22*a* and leg 26 of yoke 13. As seen thereat, the protruding axle portion 28 fits through an aperture in yoke leg 26. An extending portion 31 of knob 22*a* fits contiguously through the aperture toward camera case 11 and surrounds axle portion 28. The outside of the extending portion 31 provides the bearing surface for rotation of the case 11 which the angle of inclination of the camera case is being varied. Means such as set screw 32 are provided for locking the knob on the protruding axle portion 28. A bearing washer 33 may be provided to firmly hold the camera case 11 between the two knobs 22, 22*a* without generating undue friction.

Means are provided for generating a path for the projection of the line of sight of the lens of the camera 20. More particularly, cam assembly 36 is provided as shown in FIG. 1, a hard bearing surface 37 is provided at the bottom of camera case 11. The bearing surface 37 rides on the cam assembly 36.

It should be noted that FIG. 2 shows the camera in a horizontal position, not abutting the cam assembly 36. This showing is made merely to simplify the drawing. Actually, for the camera to ride in a horizontal position, the cam assembly 36 would have to be raised to abut the cam bearing surface 37 thereby maintaining the camera in the horizontal position.

Figure 3:
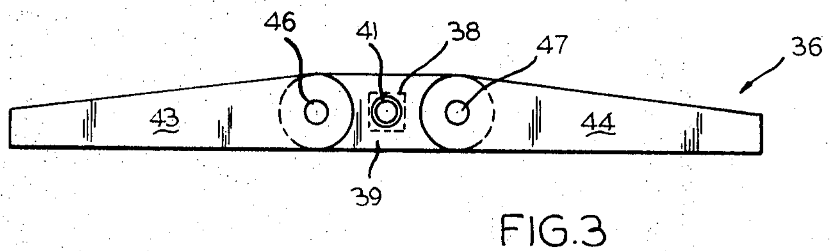
FIG. 3 is a view taken in the direction of arrows 3—3 in FIG. 2 of an embodiment of cam means used for automatically varying the angle of inclination throughout the scanning arc.
Figure 4:
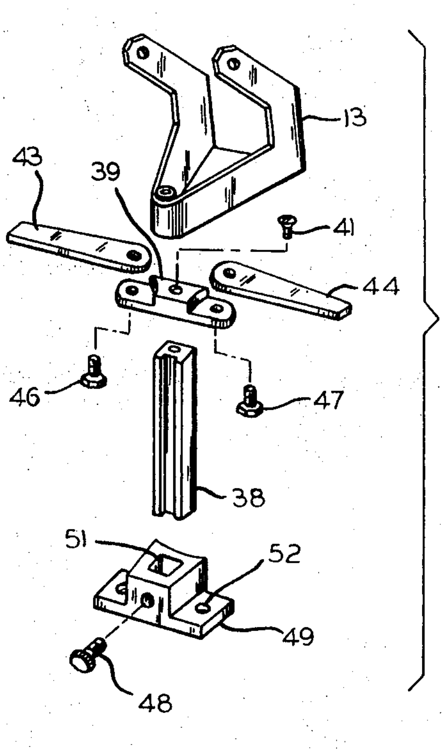
FIG. 4 is an exploded view of the cam means.

The cam assembly 36 is best seen in FIGS. 2, 3 and 4. The cam assembly comprises a post portion 38. The post portion 38 is preferably rectangularly shaped as shown in FIG. 3. It slip fits into a matching square or rectangularly shaped aperture in shroud unit 12. A wing cam mount 39 is attached to the top of post 38 using a fastener such as threaded fastener 41. A hole in the center of cam mount 39 receives post 38 in abutting relationship in a counter sunk hole at bottom of mount 39. This is best seen in FIG. 2. The top of the post 38 is tapped for receiving fastener 41. A hole 42 in mount 39 enables the fastener 41 to pass therethrough and affix mount 39 to post 38. The hole 42 is counter sunk so that the fastener 41 does not interfere with the cam action. The wing cam mount 39 supports and positions wings 43, 44. The wing cam mount 39 is arcuately shaped at its edges to receive wings 43, 44. The wings have corresponding arcuate shaped ends which enable the wings to rotate around fasteners 46, 47, respectively.

The path of the projection of the line of sight of the lens can be varied by changing the orientation of the wings. For example, when the wings are in a straight line one path is generated; when the wings are turned either away from the camera case or toward the camera case or with one away and one towards the camera case, the projection of the line of sight of the lens would be varied accordingly. The fasteners 46 and 47 are of a length so that they do not extend beyond the top surface of the cam wings 43, 44 and thus, do not interfere with the cam follower surface 37.

Means are provided for adjusting the height of the cam assembly and therefore, the angle of inclination of the camera. More particularly, fastener 48 is equipped with a knurled knob handle for easy tightening and loosening of the fastener. The end of fastener 48 abuts a key slot 49 in the post 33. Preferably, the key slot 49 is tapered to provide a more secure holding action for the fastener 48. Thus, the height of the cam is readily adjustable; by use of fastener 48, it is loosened to enable the setting of the cam assembly 36 to any desired position.

Means for guiding the cam assembly 31 may be provided. More particularly, cam guide means 49 is shown. The guide means contains a square slot 51 for receiving post 48, and means for fastening the guide means to shroud 12, such as fastener receiving aperture 52. Thus, the guide means is fastened to the shroud using any well-known fastener. The guide means acts to stabilize the cam assembly when it is raised to hold the camera to a horizontal or nearly horizontal position.

Yoke 13 is shown in FIG. 4 merely to emphasize that any yoke can be used. It must, however, be designed so that the yoke clears the cam as the camera sweeps and at the same time the yoke should hold the camera as close as possible to the center of gravity of the camera case.

Figure 5:
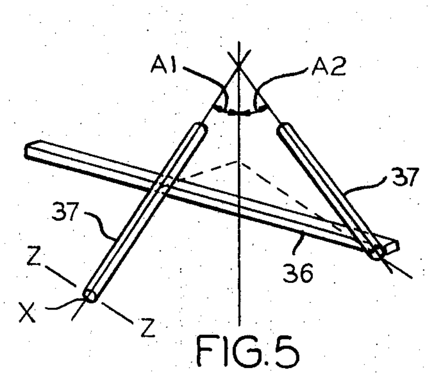
FIG. 5 is a schematic layout showing the changes in the angle of inclination as the camera progresses through the scanning arc.

As shown in FIG. 5, the angle of inclination will be changed as the camera sweeps due to the action of the cam. For example, when the camera is facing directly forward, the angle of inclination herein shown as A1 is the smallest. When the camera is at an end of its scan, then the angle of inclination shown as A2 is largest. The cam and cam followers are schematically shown in FIG. 5, and angle A1 is shown as less than angle A2.

Figure 6:
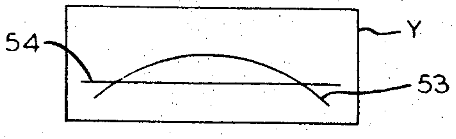
FIG. 6 shows the projection of the line-of-sight of the camera lens on a vertical plane that is parallel to the tangential line ZZ of FIG. 5 both with the cam means and without the cam means.

FIG. 6 shows the path that a projection of the line in sight of the lens makes on a horizontal plane parallel to a line ZZ tangential to the arc of the camera at point X that is when the camera is facing plane Y in the center of its scanning arc. It is seen that this path is shown as an arc curve 53. That is the path that would be traced if the cam was not used. With the cam used, as shown in FIG. 5, the projection of the line of sight of the lens on the vertical plane Y is substantially a straight line 54 shown in FIG. 6.

Figure 7:
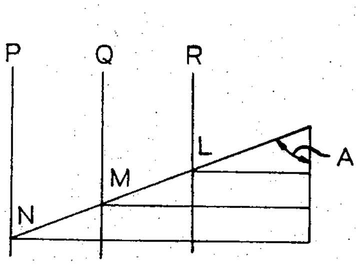
FIG. 7 is a side view of the lens projections as it sweeps through the arc of surveillance without the cam.

FIG. 7 is a side view of the projection of the line of sight of the camera when the angle of inclination is constant as it would be without cam 31. It is noted that as the distance from the lens to the surface of the planes R, Q, P increases, the focal points L, M and N drop proportionately.

Figure 8:
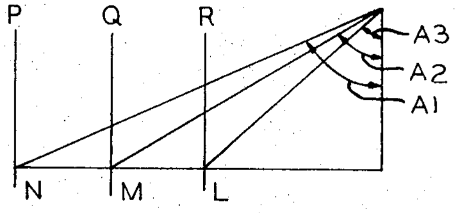
FIG. 8 is a side view of the lens projection as it sweeps through the arc of surveillance using the path generating cam.

FIG. 8 shows the effect of the cam wherein the angle of inclination is continuously changing so that when the distance between the lens and the focal points on planes R, Q and P changes, the focal points L, M and N nevertheless remain at the same level.

Thus, the camera assembly can be mounted on a wall bracket and be focused at a particular height throughout the length of its reciprocating scanning arc. With this type of arrangement, fewer cameras can cover any given area.

It is feasible that the cam can automatically raise itself and enable the camera to scan different aisles. For example, in a supermarket the camera path generating cam can be adjusted to the scanning of the first aisle closest to the camera and to successively scan the aisles further and further away merely by successively raising the cam automatically.

While the principles of the invention have been described above in connection with specific apparatus and applications, it is to be understood that this description is made only by way of example and not as a limitation on the scope of the invention.

I claim:

1. A surveillance camera device for causing a camera case having an opening for camera lenses therein to scan areas to be protected, said device comprising:

a motor for actuating the camera case to reciprocatingly move along a horizontal arc whereby the camera lens scans along the arc, and path generating means for causing the projection of the line of sight of the lens to generate a path wherein the angle of inclination of the lens varies as the camera case moves along the arc, said path generating means comprising a cam assembly for varying the angle of inclination of the lens as the camera case moves along said arc, said cam assembly comprising a centrally positioned wing cam mount, First and second wing means extending from each side of said centrally positioned wing cam mount, and wherein the positions of said first and second wing means are independently adjustable.

2. A surveillance camera device for causing a camera case having an opening for camera lenses therein to scan areas to be protected, said device comprising:

means for actuating the camera case to reciprocatingly move along a horizontal arc whereby the camera lens scans along the arc, path generating means for causing the projection of the line of sight of the lens to generate a path wherein the angle of the inclination of the lens varies as the camera moves along the arc, said path generating means comprising a cam assembly for varying the angle of inclination of the lens as the camera case moves along said arc, said camera device comprising a shroud base, means for attaching said shroud base to a vertical support, said actuating means comprising a motor actuated axle in said shroud base, a yoke assembly for attaching said camera case to said axle while enabling said camera case to rest against said cam assembly, whereby said cam assembly controls the path generated by the line of sight of the lens.

3. The surveillance camera device of claim 2, wherein the cam assembly includes means for varying the vertical position of the cam assembly to vary the original angle of inclination of said camera.

4. The surveillance camera device of claim 3 wherein said cam assembly comprises a cam surface, a cam post dependent from said cam surface, aperture means in said shroud base for receiving said cam post, and screw means for tightening against said cam post to hold said cam surface selectively extended above said shroud base means.

5. The surveillance camera device of claim 4 wherein said cam post includes a key slot for receiving said screw means, and wherein said key slot is angled.

6. The surveillance camera device of claim 5 wherein said cam surface comprises a horizontal cam surface transverse to the radius of the arc of rotation.

7. A surveillance camera device for causing a camera case having an opening for camera lenses therein to scan an area to be protected, said device comprising:

means for actuating the camera case to reciprocatingly move along a horizontal arc, whereby the camera lens scans over an area that is to be protected, path generating means including a cam assembly for varying the angle of inclination of the lens as the camera case moves along said arc, a shroud base, means for attaching said shroud base to a vertical support, said actuating means comprising a motor actuated axle in said shroud base, a yoke assembly for attaching said camera case to said axle while enabling said camera case to rest against said cam assembly, whereby said cam assembly controls the path generated by the line of the sight of the lens, said cam assembly including means for varying the vertical position of the cam assembly to vary the original angle of inclination of said camera means, said cam assembly further comprising a cam surface, a cam post dependent from said cam surface, aperture means in said shroud base for receiving said cam post, screw means for tightening against said cam post to hold said cam surface selectively extended above said shroud base, said cam post including an angled key slot for receiving said screw means, said cam surface comprising a centrally positioned wing cam mount, and first and second wing means extending from each side of said centrally positioned wing cam mount with the positions of said first and second wing means being independently adjustable.

8. The surveillance camera device of claim 7 wherein a cam surface rider is provided at the bottom of said camera case for riding on said cam surface.

9. The surveillance camera device of claim 8 wherein a guide is provided for guiding and stabilizing said cam assembly, aperture means in said guide for receiving said cam post, and means for attaching said guide to said shroud base to align said cam post receiving apertures.